(12) United States Patent
Huberland et al.

(10) Patent No.: US 10,087,944 B2
(45) Date of Patent: Oct. 2, 2018

(54) METHOD FOR CONTROLLING A COMPRESSOR

(75) Inventors: Filip Gustaaf M. Huberland, Wilrijk (BE); Uwe Pahner, Wilrijk (BE); Filip Petrus I Beyens, Wilrijk (BE); Stijn Jozef Rita Johanna Janssens, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 375 days.

(21) Appl. No.: 13/640,602

(22) PCT Filed: Apr. 8, 2011

(86) PCT No.: PCT/BE2011/000019
§ 371 (c)(1),
(2), (4) Date: Oct. 11, 2012

(87) PCT Pub. No.: WO2011/130807
PCT Pub. Date: Oct. 27, 2011

(65) Prior Publication Data
US 2013/0039737 A1  Feb. 14, 2013

(30) Foreign Application Priority Data
Apr. 20, 2010  (BE) .................................. 2010/0253

(51) Int. Cl.
*F04D 27/02* (2006.01)
*F04D 17/12* (2006.01)

(52) U.S. Cl.
CPC ......... *F04D 27/0261* (2013.01); *F04D 17/12* (2013.01); *F04D 27/0284* (2013.01)

(58) Field of Classification Search
CPC .......... F04B 23/04; F04B 25/00; F04B 27/00; F04B 41/06; F04B 49/007; F04B 49/06;
(Continued)

(56) References Cited

U.S. PATENT DOCUMENTS

| 4,443,156 A | * | 4/1984 | Dunnam, Jr. ................... 417/12 |
| 5,378,129 A | * | 1/1995 | Dunaevsky ......... F04C 29/0057 418/55.5 |

(Continued)

FOREIGN PATENT DOCUMENTS

| GB | 261138 A | 11/1926 |
| JP | H04-136498 A | 5/1992 |

(Continued)

OTHER PUBLICATIONS

International Search Report for PCT/BE2011/000019, dated Nov. 2, 2011.
(Continued)

*Primary Examiner* — Kenneth J Hansen
*Assistant Examiner* — Benjamin Doyle
(74) *Attorney, Agent, or Firm* — Bacon & Thomas, PLLC

(57) ABSTRACT

A method for controlling a compressor that includes a compressor element, whereby during a transition from full load or partial load to zero load, a process A is followed that involves: (1) reducing the inlet pressure; and (2) reducing the speed and/or the drive torque. During a transition from zero load to part load or full load, a process B is followed that involves: (3) increasing of the speed or drive; and (4) increasing the inlet pressure.

20 Claims, 2 Drawing Sheets

(58) Field of Classification Search
CPC ............ F04B 49/065; F04B 2203/0208; F04B 2203/0209; F04B 2205/01–2205/05; F04B 2205/07; F04B 2205/09–2205/11; F04D 17/08; F04D 7/12; F04D 27/004; F04D 27/007; F04D 17/12; F04D 27/0261; F04D 27/0284
USPC .......... 417/19, 20, 26, 28, 42, 43, 45, 44.11, 417/279, 53, 34, 46, 47
See application file for complete search history.

(56) References Cited

U.S. PATENT DOCUMENTS

| | | | | |
|---|---|---|---|---|
| 5,540,558 | A | * | 7/1996 | Harden et al. .................. 417/53 |
| 5,584,371 | A | * | 12/1996 | Kelledes ................ F01P 7/042 123/41.12 |
| 5,820,352 | A | * | 10/1998 | Gunn et al. ...................... 417/53 |
| 6,139,280 | A | * | 10/2000 | Holt et al. ...................... 417/26 |
| 6,293,766 | B1 | | 9/2001 | Blotenberg |
| 6,599,094 | B2 | * | 7/2003 | Kanazaki et al. .............. 417/53 |
| 7,010,393 | B2 | * | 3/2006 | Mirsky ................ F04D 15/029 417/1 |
| 7,276,870 | B2 | * | 10/2007 | Weigel .......................... 318/434 |
| 2002/0100285 | A1 | * | 8/2002 | Baruschke ........... B60H 1/3208 62/133 |
| 2004/0016246 | A1 | * | 1/2004 | Furukawa .......... B60H 1/00828 62/183 |
| 2005/0095488 | A1 | * | 5/2005 | Formanski ............. F04B 25/00 429/434 |
| 2005/0210895 | A1 | * | 9/2005 | Horton ............................ 62/158 |
| 2006/0016175 | A1 | * | 1/2006 | Pott ...................... F01N 13/009 60/285 |
| 2007/0180841 | A1 | * | 8/2007 | Bae ......................... F04B 49/06 62/228.1 |
| 2007/0189905 | A1 | * | 8/2007 | Dinsdale ................. F04D 17/12 417/2 |
| 2007/0237648 | A1 | * | 10/2007 | Ooya ................... B60H 1/3216 417/19 |
| 2007/0261420 | A1 | * | 11/2007 | Baruschke ........... B60H 1/3208 62/115 |
| 2008/0019842 | A1 | * | 1/2008 | Coates ................... B64D 13/06 417/2 |
| 2008/0038109 | A1 | * | 2/2008 | Sandstede ............... F01D 25/22 415/111 |
| 2008/0187298 | A1 | * | 8/2008 | Holden et al. ................ 388/811 |
| 2008/0188173 | A1 | * | 8/2008 | Chen ..................... F04D 27/004 454/239 |
| 2009/0057984 | A1 | * | 3/2009 | Matsumoto .......... B65H 3/0607 271/10.03 |
| 2009/0119050 | A1 | | 5/2009 | Hayashi |
| 2009/0241771 | A1 | | 10/2009 | Manning et al. |
| 2010/0178174 | A1 | * | 7/2010 | Mehaffey ................ F04B 49/20 417/2 |
| 2012/0086382 | A1 | * | 4/2012 | Peto .................... H02M 1/4225 318/729 |

FOREIGN PATENT DOCUMENTS

| | | |
|---|---|---|
| JP | H08-042489 A | 2/1996 |
| JP | 2001050185 A | 2/2001 |
| JP | 2005-016414 A | 1/2005 |
| JP | 2006200546 A | 8/2006 |
| WO | 2007095537 A1 | 8/2007 |

OTHER PUBLICATIONS

International Preliminary Report on Patentability for PCT/BE2011/000019, dated Jun. 26, 2012.
Japanese Office Action dated Feb. 23, 2016, for JP 2015-55509, and English translation thereof.

* cited by examiner

METHOD FOR CONTROLLING A COMPRESSOR

BACKGROUND OF THE INVENTION

A. Field of the Invention

The present invention relates to a method for controlling a compressor that has one or more compressor elements, whereby each compressor element is equipped with an inlet and an outlet, and whereby the compressor can be connected to a load that makes use of compressed gas.

B. Related Art

More specifically, the invention is intended for saving energy when going from full load or part load to zero load or vice versa, whereby the compressor contains a control unit that controls the speed of the aforementioned compressor element or the aforementioned compressor elements at nominal speed, or within a certain nominal speed range.

In many cases it is desirable for the flow of the compressed gas at the compressor outlet to be controllable to a certain extent, for example if the compressor supplies a pressure network with compressed gas. In such a situation the gas flow supplied is preferably adjusted according to the consumption in the pressure network.

If at least one of the compressor elements belonging to the compressor is of the screw type, the gas flow supplied can be controlled in a known way without this essentially being at the expense of efficiency.

In such a case the inlet pressure of the compressor element is typically reduced at constant speed (however, the foregoing is not the case if the compressor element is constructed according to the turbo type).

If the compressor is of the turbo type, it preferably operates at a more or less constant flow, whereby the turbo compressor runs at nominal speed. At nominal speed the compressor operates at full load whereby the compressor operates at its optimum operating point.

The outlet flow can be varied to a limited extent in an energy-efficient way by varying the speed of the compressor or by means of inlet guide vanes and/or diffuser guide vanes.

When the demanded flow is reduced further, other methods are applied to control the outlet flow.

Traditionally the surplus proportion of compressed gas at the compressor outlet is blown off by making use of a blow-off valve.

Another known method consists of regularly blowing off the full flow at the outlet of the compressor, or recirculating it until the pressure in a pressure network falls below a certain value, after which the compressor again supplies the full flow.

In this way the turbo compressor can always adjust the supplied flow to the demanded flow.

An important disadvantage of the known methods consists of them being energy intensive.

Another, more energy-efficient way to reduce the flow supplied, is to install adjustable inlet guide vanes, or alternatively diffuser guide vanes, whereby the angle of incidence of the flow is adjusted each time the flow rate changes (at the inlet and outlet of the compressor stage respectively). A disadvantage of this is the relatively high complexity and production costs attached to this.

In all methods described, the speed of the compressor is kept the same when going from the loaded to the unloaded state or vice versa.

Another way of further reducing the supplied flow for a speed-controlled centrifugal compressor is to reduce its speed, whereby the outlet pressure is first or simultaneously reduced by means of a blow-off valve so that a low unloaded power can be obtained. The compressor then does not supply any flow to the pressure network.

A disadvantage of this, however, is that significant losses arise in the transition between the loaded and unloaded states and vice versa, because the power of the centrifugal compressor is not very dependent on the final pressure.

SUMMARY OF THE INVENTION

The purpose of the present invention is to provide a solution to one or more of the aforementioned disadvantages and/or other disadvantages by providing a method for controlling a compressor that has one or more compressor elements, whereby each compressor element has an inlet and an outlet, whereby during a transition from full load or partial load to zero load, at least a first compressor element goes through a process A that comprises the following steps:
  the at least temporary reduction of the inlet pressure of this first compressor element; and
  the subsequent or simultaneous or partly simultaneous and partly subsequent reduction of the speed and/or the drive torque of this first compressor element to a lower value or zero,
and whereby during a transition from zero load to partial load or full load, at least a first compressor element goes through a process B that comprises the following steps:
  increase of the speed and/or the drive torque of the first compressor element to a nominal value or within a nominal value range; and
  the subsequent or simultaneous or partly simultaneous and partly subsequent controlled increase of the inlet pressure of the first compressor element concerned.

The "controlled increase of the inlet pressure" means actively increasing this inlet pressure by controlling certain components of the compressor such as valves, compressor elements or similar by means of a control unit, for example.

Preferably, before reducing the inlet pressure of the first compressor element, the process A also comprises the step of reducing the outlet pressure, for example by opening a blow-off valve on the pressure side of this first compressor element.

According to a preferred aspect of the invention, after bringing the inlet pressure of the first compressor element to the right level, process B also comprises the step of increasing the outlet pressure, for example by closing a blow-off valve on the pressure side of this first compressor element.

An advantage of the method according to the invention is that the energy losses in the transitional period between full load and part load or zero load and/or vice versa are limited compared to the existing methods for controlling the speed of a compressor element.

For example, when going through a process A, the first compressor element absorbs less power. Alternatively, when driving the compressor element with a certain torque during this process A, the speed of the first compressor element decreases less quickly during a transition from full load to part load or zero load. A specific case can be that this drive torque is equal to zero, such that the first compressor element only slows down as a result of its own air resistance.

If after a certain time the first compressor element does not receive a command again to operate at full load, the speed is stabilised at a set minimum speed.

Because when going through such a process A, the inlet pressure is reduced and the first compressor element remains at speed for a longer time, a transfer to full load during this timespan requires little energy. An additional advantage of the reduced inlet pressure is that the set minimum speed is relatively close to the nominal speed, subject to minimum torque, and thus can be done with minimum energy requirements without a lot of energy being required for this. Also, if the compressor element runs at minimum speed, a transfer to full load requires less energy compared to the existing methods.

In addition when going through a process B, less energy is employed in bringing the compressor element to nominal speed when switching from part load or zero load to full load.

Alternatively—for the same available motor torque or with a certain torque control—the total time required for the transition to full load can be reduced, which means an energy advantage. In addition the compressor is then able to respond more quickly to changes in the compressed air demand. In this way the user can realise a more accurate, more efficient pressure control for a certain available installation. A specific case of this can be that the drive torque is equal to the maximum torque to be supplied by the motor, whereby the compressor element is brought to nominal speed as quickly as possible.

DESCRIPTION OF THE DRAWINGS

With the intention of better showing the characteristics of the invention, a preferred method according to the invention is described hereinafter by way of an example without any limiting nature, with reference to the accompanying drawings, wherein.

DETAILED DESCRIPTION OF PREFERRED EMBODIMENTS OF THE INVENTION

Figure 1:
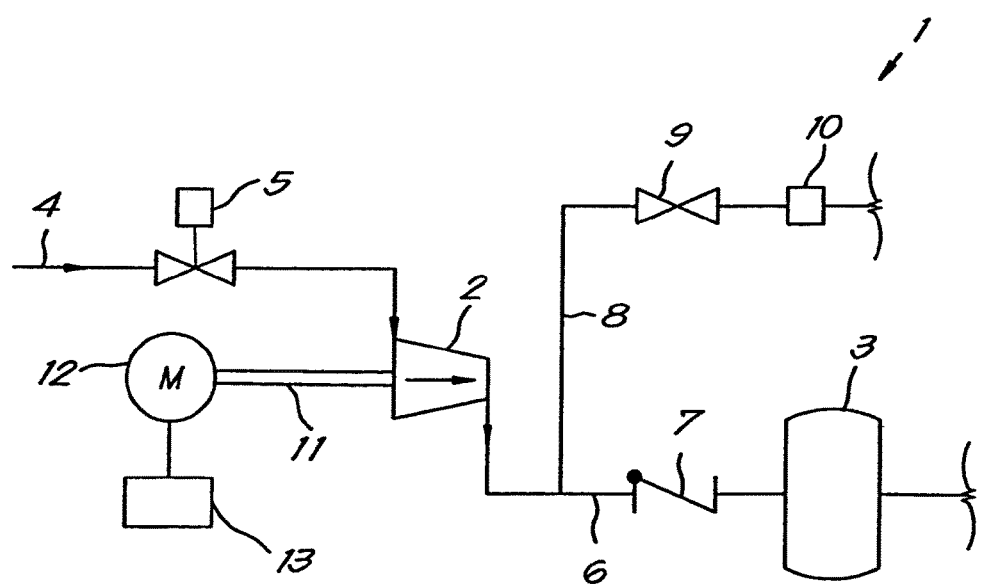
FIG. 1 schematically shows a compressor that is controlled according to a method according to the invention.

FIG. 1 shows a compressor 1 which, in this non-limiting example, only contains one compressor element 2, in this case of the turbo type, and this compressor element supplies compressed gas to a pressure network 3, to which one or more compressed gas users are connected.

An inlet pipe on the intake side of the compressor element 2 has an inlet valve 5 and is connected to the inlet for the gas to be compressed of the compressor element 2.

The inlet valve 5 in this case is, but not necessarily so, constructed such that, even in the fully closed state, it allows a certain minimum gas flow through to the compressor element 2. Such an inlet valve 5 can, according to a variant not shown in the drawings, for example but not necessarily so, be realised by constructing the inlet valve 5 in the form of a shut-off valve across which there is a bypass pipe that, in the fully closed state of the shut-off valve, allows a flow across this shut-off valve. Alternatively such an inlet valve 5 can contain a valve body that does not fully close a passage through a seat in the closed state, for example by providing a flow-through opening through this valve body and/or this seat.

The outlet of the compressor element 2 for compressed gas is connected to the pressure network 3 via an outlet pipe 6 with a non-return valve 7. The aforementioned non-return valve 7 can be constructed in the conventional way and consist of a valve body that is pressed against a seat by means of a spring, but according to the invention it is not excluded that the aforementioned non-return valve 7 is constructed as another type of valve, such as a pneumatic or electrically driven valve, or even a 3-way valve.

According to the invention it is not excluded that the compressor element 2 is constructed in the form of another type of compressor element other than the turbo type, for example in the form of a speed-controlled screw compressor element.

Between the outlet of the compressor element 2 and the non-return valve 7, there is a branch 8 with a blow-off valve 9 in it, on which a noise damper 10 is preferably, but not necessarily, mounted. In the aforementioned case, whereby the non-return valve 7 is replaced by a 3-way valve, this 3-way valve can also replace the blow-off valve 9.

In such a case the compressor element 2 is driven directly by a shaft 11 of a motor 12 that has a control unit 13, in which case it is called a directly driven compressor element.

The driving of a compressor 1 according to a method according to the invention is very simple and as follows.

The compressor element 2 draws in gas, for example but not necessarily air, through the inlet pipe 4. The air is compressed in a known way in the compressor element 2 and supplied to a pressure network 3 via an outlet pipe 6.

At full load the compressor element 2 supplies a certain flow of compressed air to its outlet. In this mode the compressor element 2 operates at a nominal speed, or within a certain nominal speed range, and the inlet valve 5 is open and the blow-off valve 9 closed.

The compressor element 2 is designed and driven at nominal speed so that at full load the compressor element 2 performs optimally, or in other words the energy consumption per quantity of air supplied, also called the specific energy consumption, is the lowest. Of course, the aim is to have the compressor element 2 operate in the aforementioned optimum operating region at all times.

If no compressed air is taken off the pressure network 3, the pressure in the aforementioned network will increase as the compressor element 2 is still operating in full load mode and continually supplies compressed air. The pressure in the pressure network 3 rises. According to the invention, during this transition from full load to zero load, a process A can be gone through that preferably contains the step of opening the blow-off valve 9 to reduce the outlet pressure of the compressor element 2. As a result the compressed air is blown off into the atmosphere. The blow-off valve 9 can also open into a reservoir for recirculating the blown-off gas.

The opening of the blow-off valve 9 results in a pressure reduction at the outlet of the compressor element 2, such that the non-return valve 7, which as stated can also consist of another type of valve such as a controlled valve, for example a three-way valve, is closed and the compressor element 2 is isolated from the pressure network 3.

Then, in going through the process A, the pressure at the inlet of the compressor element 2 is reduced, which for example is realised by closing the inlet valve 5. The term "the closing of the inlet valve" does not necessarily mean here that this inlet valve is effectively completely closed. In practice it can be that the inlet valve 5 is not 100% shut off in the fully closed state, such that a small flow is still possible through this inlet valve 5. At this reduced inlet pressure, the speed of the compressor element 2 is reduced, for example by the motor 12 supplying a reduced torque.

According to the invention, the reduction of the speed can also be realised by using a VSD motor, for example with frequency control, and controlling it in an appropriate way.

The step of reducing the speed according to the invention is done either after the aforementioned step of the inlet pressure reduction, or together with this inlet pressure reduction, or partially together with and partially after this inlet pressure reduction.

As a result of the reduced inlet pressure the power needed for compression decreases greatly, such that the compressor element 2, even in the event of a reduced torque, stays at speed for a longer period of time.

When the speed of the compressor element 2 falls, the mass flow drawn in will also fall, which results in the pressure drop across the inlet valve 5 falling. The pressure drop across the aforementioned valve 5 can be increased by further closing the valve 5 as the speed falls.

Increasing the pressure drop across the inlet valve 5 by further closing the valve 5 is appropriate if a screw type compressor is used. In such a case, as an alternative, the inlet valve 5 can also be put in its final closed state in one go.

If a centrifugal compressor is used, it can be chosen to keep the valve in the same state and to allow the inlet pressure to rise again. As is known, a centrifugal compressor is not able to realise significant heads at low speeds.

If, finally, an unloaded state with a very low speed needs to be reached, this implies that the inlet and outlet pressure of such a compressor element must be close to one another.

If the compressed air offtake in the pressure network 3 does not increase, the speed will ultimately stabilise at a value that can depend on a set reduced torque, for example.

If the compressed air offtake in the pressure network 3 increases, which means that there is a transition from zero load to part load or full load, then according to the invention, during this transient state, a process B can be gone through whereby, for example by an increase in motor torque, the speed is again increased to the nominal speed or to the nominal speed range, after which the inlet pressure of the compressor element 2 is increased in a controlled manner, for example by opening the inlet valve 5, and preferably until the inlet pressure reaches the nominal value, and whereby the outlet pressure of the compressor element 2 is preferably increased.

Again the speed control can also be realised by frequency control of the motor.

In this case the outlet pressure is raised by closing the blow-off valve 9. The non-return valve 7 opens and in this way the compressor element 2 can again supply compressed air to the pressure network 3.

A specific example of this is a situation in which the inlet valve 5 is initially (almost) closed. If the initial speed is low it means that the pressure drop across the inlet valve 5 is almost zero (because the mass flow through the valve is very low) and thus the inlet pressure of the first compressor element is then almost equal to atmospheric pressure (assuming that the inlet valve 5 is mounted on an atmospheric inlet). By increasing the speed—with the same valve states—the inlet pressure will first fall as a result of the increased pressure drop across the inlet valve 5. When the nominal speed is reached, the inlet valve 5 can be opened such that the inlet pressure rises back to atmospheric pressure, and the blow-off valve is then closed such that the outlet pressure rises and the non-return valve opens. During this transition the inlet pressure is equally low.

In the transition from full load to part load or vice versa the torque is not used to compress the air. During these transitional phases the inlet valve 5 is closed such that the compressor element 2 operates at a reduced inlet pressure.

It is clear that as a result, a relatively high minimum stabilised speed can be maintained, and with a minimum torque the speed can again be increased to the nominal speed, or with the same torque a faster acceleration to the nominal speed can be realised.

If the speed of the compressor element 2 is changed by controlling the torque of the motor 12, it is preferably constructed so that during a transition from full load to zero load the torque is equal to zero and during a transition from zero load to full load, the compressor element 2 is driven with the maximum motor torque.

In this way the energy losses during the transitional periods between full load or part load to zero load and vice versa can be limited. This is also the most important advantage of the method according to the invention.

Moreover the invention described is relatively cost favourable compared to relatively expensive inlet or diffuser guide vanes, for example.

The aforementioned steps in the transition from full load to part load or zero load or vice versa can be done in the aforementioned order or simultaneously or partly simultaneously.

In FIG. 1 the inlet valve 5 and the blow-off valve 9 are shown as two separate components. It is also possible to integrate the blow-off valve 9 and inlet valve 5 into one component.

In another embodiment the blow-off valve 9 and the inlet valve 5 can be coupled together mechanically and/or electrically or in another way so that they can also be controlled together.

The inlet pressure is adjusted in the examples described above by closing the inlet valve 5, which is in the inlet pipe 4 of the compressor element 2, such that the air supply is choked. However, the aforementioned pressure change at the inlet can also be brought about in other ways without acting outside the scope of the invention. For example—if the inlet pressure is greater than atmospheric pressure—a blow-off valve can be opened that blows off the gas to the atmosphere. As a result the inlet pressure will also fall.

Figure 2:
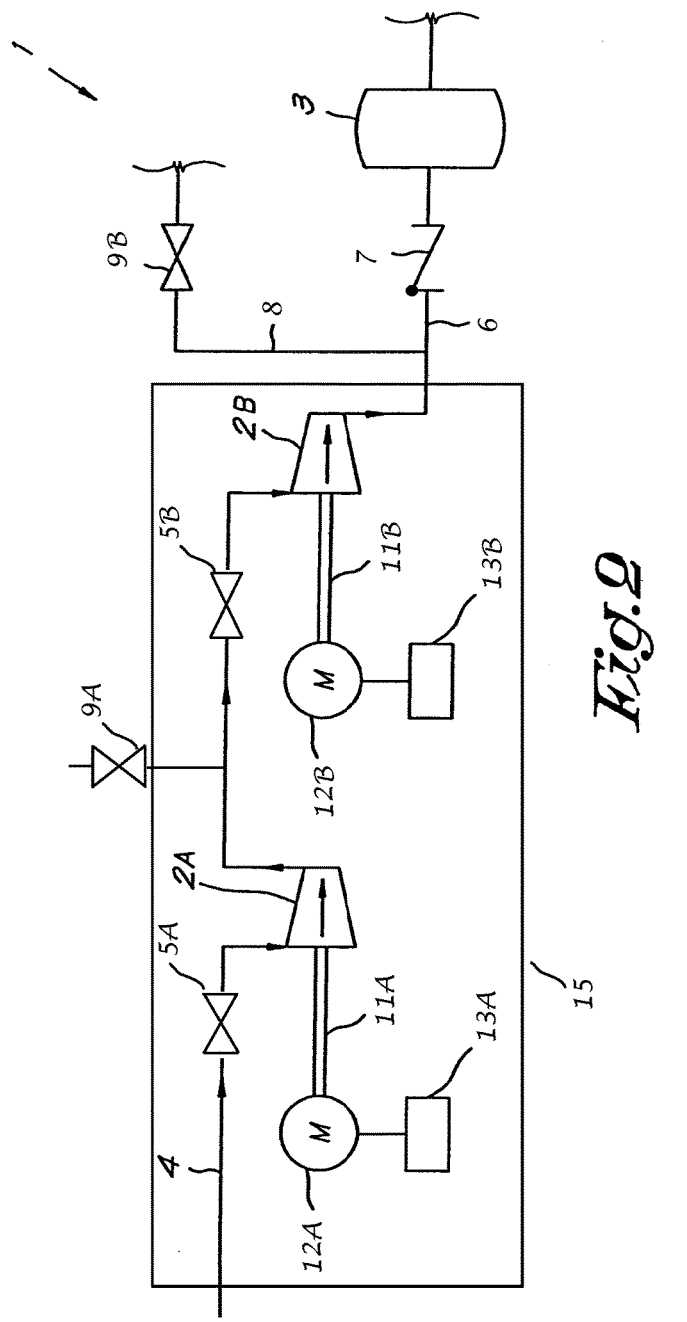
FIG. 2 shows a variant according to FIG. 1.

Thus in the situation illustrated in FIG. 2, the aforementioned pressure decrease is realised by adjusting the operating mode of a second compressor element 2A upstream from the compressor element 2B concerned, that preferably but not necessarily is constructed in the form of a screw compressor element with controllable speed, where the compressor elements 2A and 2B can be incorporated in one housing 15. Alternatively it can be a screw compressor element equipped with a blow-off valve or inlet valve or similar.

A multistage compressor also enables the outlet pressure of the compressor element to be changed by adjusting the operating mode of a compressor element downstream from the compressor element concerned. Alternatively the compressor element downstream from the compressor element concerned can be a screw compressor element with controllable speed.

The method according to the invention can also be applied to a compressor that has at least two compressor elements, which, directly are otherwise, are driven by one and the same motor.

The present invention is by no means limited to the embodiment described as an example and shown in the drawings, but such a method can be realised in all kinds of variants, without departing from the scope of the invention.

For example, compressor elements 2A and 2B of FIG. 2 can each have the features disclosed in any of the disclosed embodiments of the compressor elements, including the compressor element illustrated in FIG. 1. In so doing, the outlet pressure of a first compressor element 2A can be reduced by opening a blow-off valve 9A on a pressure side of the first compressor element 2A or on the outlet side, for example, opening valve 9B of another compressor element 2B located downstream from the first compressor element.

The invention claimed is:

1. A method for controlling a compressor that includes one or more compressor elements, each element having an inlet on an inlet side and an outlet on an outlet side, comprising:
   during a transition from full load or partial load to zero load, at least a first of said compressor elements carries out a process A that comprises the steps:
   at least temporarily reducing an inlet pressure of the first compressor element;
   subsequently or simultaneously, reducing a drive torque of the first compressor element to a zero torque while a speed of the first compressor element is decreased to a minimum speed; and
   increasing the drive torque from zero torque to a minimum torque to maintain the rotation of the first compressor element at the minimum speed at which the first compressor element is rotating, and
   during a transition from zero load to partial load or full load, at least the first of said compressor elements carries out a process B that comprises the steps:
   increasing the drive torque of the first compressor element from the minimum torque to a maximum torque in which the first compressor element is rotating from the minimum speed to a nominal speed or to within a nominal speed range; and
   subsequently or simultaneously increasing the inlet pressure of the first compressor element.

2. The method according to claim 1, wherein the process A comprises the step of, at least before reducing the inlet pressure of the first compressor element, reducing an outlet pressure of the first compressor element.

3. The method according to claim 2, wherein the outlet pressure of the first compressor element is reduced by opening a blow-off valve on the outlet side of the first compressor element or on the outlet side of another compressor element located downstream from the first compressor element.

4. The method according to claim 1, wherein the process B comprises the step of, at least after increasing the inlet pressure of the first compressor element, increasing an outlet pressure of the first compressor element.

5. The method according to claim 4, wherein the outlet pressure of the first compressor element is raised by closing a blow-off valve on the outlet of the first compressor element or on an outlet side of another compressor element located downstream from the first compressor element.

6. The method according to claim 5, wherein the another compressor element located downstream from the first compressor element is a screw compressor element.

7. The method according to claim 1, wherein the process B comprises the step of increasing the inlet pressure of the first compressor element to an operating value.

8. The method according to claim 1, wherein the inlet pressure of the first compressor element is changed by opening or closing an inlet valve on the inlet side of the first compressor element or on an inlet side of another compressor element located upstream from the first compressor element.

9. The method according to claim 1, wherein the inlet pressure of the first compressor element is changed by opening or closing a blow-off valve located upstream from the first compressor element.

10. The method according to claim 1, wherein the inlet pressure of the first compressor element is changed by adjusting an operating mode of another compressor element located upstream from the first compressor element.

11. The method according to claim 1, wherein the inlet pressure of the first compressor element is changed by controlling another compressor element located upstream from the first compressor element, said another compressor element being constructed in the form of a screw compressor element.

12. The method according to claim 2, wherein the outlet pressure of the first compressor element is changed by adjusting an operating mode of another compressor element, located downstream from the first compressor element.

13. The method according to claim 12, wherein the another compressor element located downstream from the first compressor element is a screw compressor element.

14. The method according to claim 1, wherein the one or more compressor elements comprises a directly driven compressor element or a compressor with at least one directly driven compressor element.

15. The method according to claim 7, wherein an outlet pressure of the first compressor element is reduced by opening a blow-off valve on the outlet side of the first compressor element or on the outlet side of another compressor element located downstream from the first compressor.

16. The method according to claim 14, wherein the inlet pressure of the first compressor element is changed by opening or closing an inlet valve on the inlet side of the first compressor element or on an inlet side of another compressor element located upstream from the first compressor element, wherein an outlet pressure of the first compressor element is reduced by opening a blow-off valve on the outlet side of the first compressor element or on the outlet side of another compressor element located downstream from the first compressor element, wherein said inlet valve and said blow-off valve are controlled together.

17. The method according to claim 1, wherein the compressor comprises at least one compressor element that is constructed in the form of a directly driven turbo compressor element, and
   at least another compressor element that is constructed in the form of a speed-controlled screw compressor element.

18. The method according to claim 17, wherein all said compressor elements are incorporated in one housing.

19. The method according to claim 1, wherein in process A the step of reducing the drive torque of the first compressor element to the zero torque takes place subsequently to the reduction of the inlet pressure of the first compressor element.

20. The method according to claim 1, wherein the minimum speed is increased to the nominal speed or to within a nominal speed range with a minimal amount of torque.

* * * * *